US009809333B2

(12) United States Patent
Minamino et al.

(10) Patent No.: US 9,809,333 B2
(45) Date of Patent: Nov. 7, 2017

(54) BOX-PACKING SYSTEM

(71) Applicant: ISHIDA CO., LTD., Kyoto-shi, Kyoto (JP)

(72) Inventors: Shizuo Minamino, Ritto (JP); Kousuke Watanabe, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 15/117,655

(22) PCT Filed: Jan. 30, 2015

(86) PCT No.: PCT/JP2015/052739
§ 371 (c)(1),
(2) Date: Aug. 9, 2016

(87) PCT Pub. No.: WO2015/129388
PCT Pub. Date: Sep. 3, 2015

(65) Prior Publication Data
US 2016/0347487 A1  Dec. 1, 2016

(30) Foreign Application Priority Data
Feb. 28, 2014 (JP) .................................. 2014-038465

(51) Int. Cl.
*B65B 5/06* (2006.01)
*B25J 9/00* (2006.01)
*B25J 15/06* (2006.01)
*B65B 35/38* (2006.01)
*B65B 57/02* (2006.01)

(52) U.S. Cl.
CPC ............... *B65B 5/06* (2013.01); *B25J 9/0093* (2013.01); *B25J 15/0616* (2013.01); *B65B 35/38* (2013.01); *B65B 57/02* (2013.01)

(58) Field of Classification Search
USPC ........................................................ 700/223
See application file for complete search history.

(56) References Cited

FOREIGN PATENT DOCUMENTS

| JP | 07-076302 A | 3/1995 |
|----|-------------|--------|
| JP | 2681720 B2 | 11/1997 |

(Continued)

OTHER PUBLICATIONS

Translation of the Written Opinion of the International Searching Authority, dated Sep. 15, 2016.

*Primary Examiner* — Kyle Logan
(74) *Attorney, Agent, or Firm* — Global IP Counselors, LLP

(57) ABSTRACT

A box-packing system having a first conveyor, a first robot that applies suction, holds, and transports a package, and a control device. The package includes soft packaging material, and is conveyed by the first conveyor. The control device operates the first robot to move the package to a box-packing preparation area. The first robot has a suction part applying suction the package from above, an arm that moves the suction part in a horizontal direction and a vertical direction, and a servomotor. The servomotor drives the arm so that the suction part can apply suction to the package at a predetermined vertical location. An acquisition part of the control device acquires thickness information of the package. The determination part determines the predetermined height location based the thickness information. The command generation part drives the servomotor in response to the predetermined height location determined by the determination part.

3 Claims, 8 Drawing Sheets

(56) References Cited

FOREIGN PATENT DOCUMENTS

| | | | |
|---|---|---|---|
| JP | 2002-265039 | A | 9/2002 |
| JP | 2008-087827 | A | 4/2008 |
| JP | 2011-213412 | A | 10/2011 |

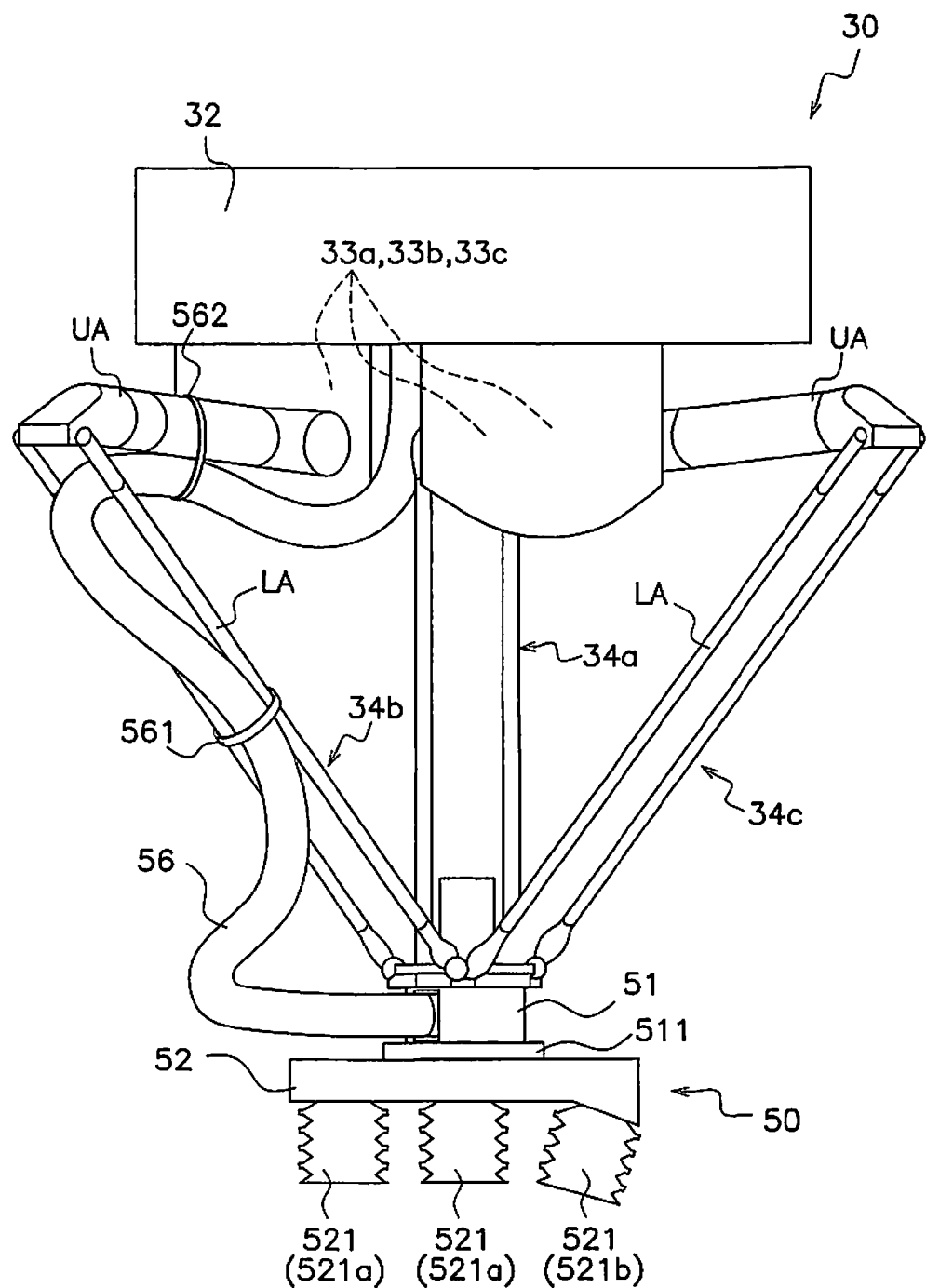
F I G. 3

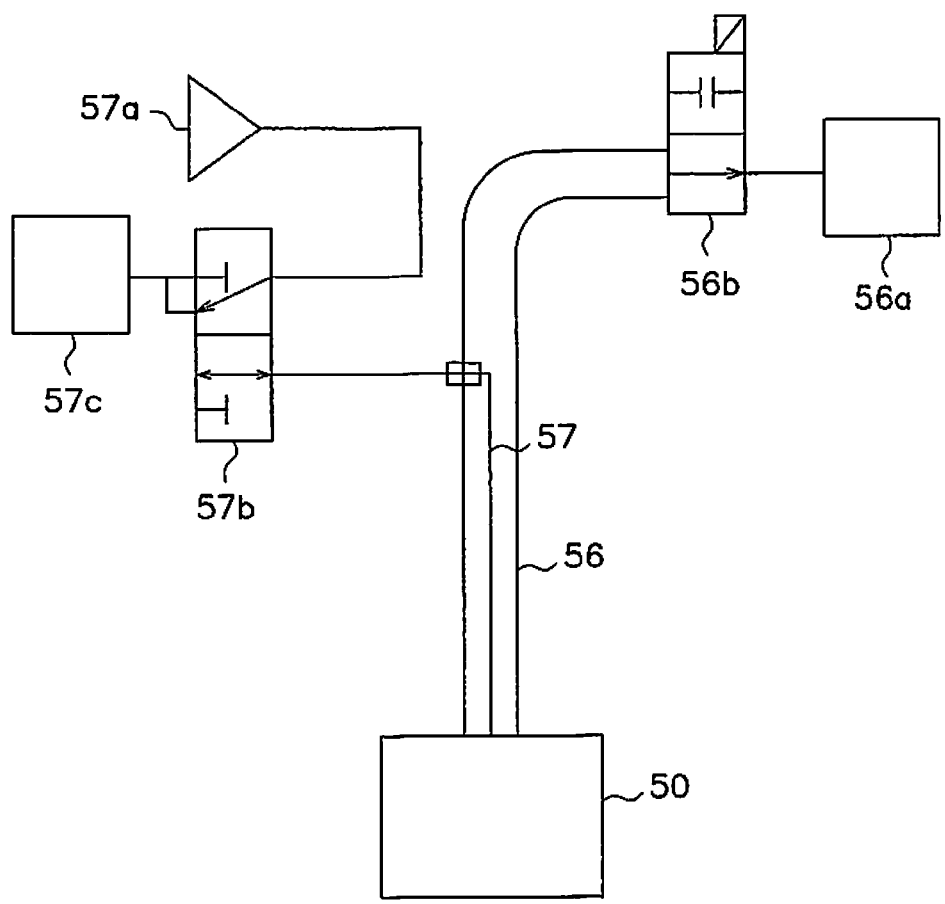
F I G. 8

BOX-PACKING SYSTEM

CROSS-REFERENCE TO RELATED APPLICATIONS

This U.S. National stage application claims priority under 35 U.S.C. §119(a) to Japanese Patent Application No. JP-2014-038465, filed in Japan on Feb. 28, 2014, the entire contents of which are hereby incorporated herein by reference.

BACKGROUND ART

There have been conventional box-packing systems which convey articles with a conveyance apparatuses, carry them to a different site using robots during the conveyance, and then pack them in a box. JP-A No. 2011-213412 discloses a box-packing system which comprises robots having an arm and a suction part, for example. The robot uses the suction part to apply force to and hold an article conveyed by one conveyance apparatus. Then, the robot drives the arm to carry the article to a different conveyance apparatus.

SUMMARY OF INVENTION

Technical Problem

In the box-packing system disclosed in the above reference (JP-A No. 2011-213412), the box-packing system needs to operate at a high speed to accelerate a packing process. However, if such a robot operates at a high speed, the suction part may not be able to apply suction to and hold an article securely. Consequently, it is difficult to accelerate a packing process.

An object of the present invention is to provide a box-packing system that achieves acceleration of a packing process.

Solution to Problem

A box-packing system according to the present invention comprises a conveyance apparatus, a robot, and a control device. The robot applies suction, holds, and transports an article. The article is packaged with a soft packaging material and conveyed by the conveyance apparatus. The control device controls the robot to move the article to a box-packing preparation area. Moreover, the robot includes a suction part, an arm, and a drive part. The suction part applies suction to the article from above. The arm is able to move the suction part in a horizontal direction and a vertical direction. The drive part drives the arm in order for the suction part to apply suction to the article at a predetermined vertical location. Moreover, the control device has an acquisition part, a determination part, and a command generation part. The acquisition part acquires thickness information of the article. The determination part determines the predetermined vertical location on the basis of the thickness information. The command generation part generates a command for driving the drive part on the basis of the predetermined vertical location determined by the determination part.

With the box-packing system according to the above present invention, the vertical location at which the suction part applies suction to the package is determined on the basis of the thickness information of the package. The arm is driven on the basis of the determined information. The suction part is thereby able to securely apply suction to and hold the package. Therefore, the acceleration of a packing process is able to be achieved.

Moreover, it is preferable that the box-packing system according to the present invention further comprises an evening part that smooths or evens out an upper surface of the soft packaging material. The evening part flatly evens an article packaged with the soft packaging material. The acquisition part acquires the thickness information of the article evened by the evening part. The suction part thereby acquires appropriate thickness information of the article held by the suction part.

Moreover, it is preferable that the evening part has a seal check mechanism. The seal check mechanism inspects a bag produced of the soft packaging material for a sealing defect. The article is thereby able to be judged to be satisfactory before the article is packed into a box.

Moreover, it is preferable that the robot arranges the article in a box-pack placement in the box-packing preparation area. The efficiency of the packing process is thereby improved.

Moreover, it is preferable that the command generation part generates first and second commands. The first command is a command for moving the suction part to the predetermined vertical location to apply suction to the article with the suction part. The second command is a command for moving the suction part in a horizontal direction to move the article to the box-packing preparation area in a state in which the article is held by suction by the suction part. A location of the suction part in a vertical direction is adjusted. After the article has been held with suction by the suction part, the article is moved in the horizontal direction, and is carried to the box-packing preparation area. The article is thereby held by suction at the predetermined vertical location which corresponds to the thickness of the article. Consequently, the articles is able to be withstand suction, and the suction state of the article during the horizontal movement is able to be maintained.

Advantageous Effect of Invention

With the box-packing system according to the present invention, the acceleration of a packing process is able to be achieved.

BRIEF DESCRIPTION OF DRAWINGS

FIG. 3 is a schematic view of a first robot.

FIG. 8 illustrates the suction movement part and components connected to the suction movement part.

DESCRIPTION OF EMBODIMENT (1) Schematic Configuration of Box-Packing System

Figure 1:
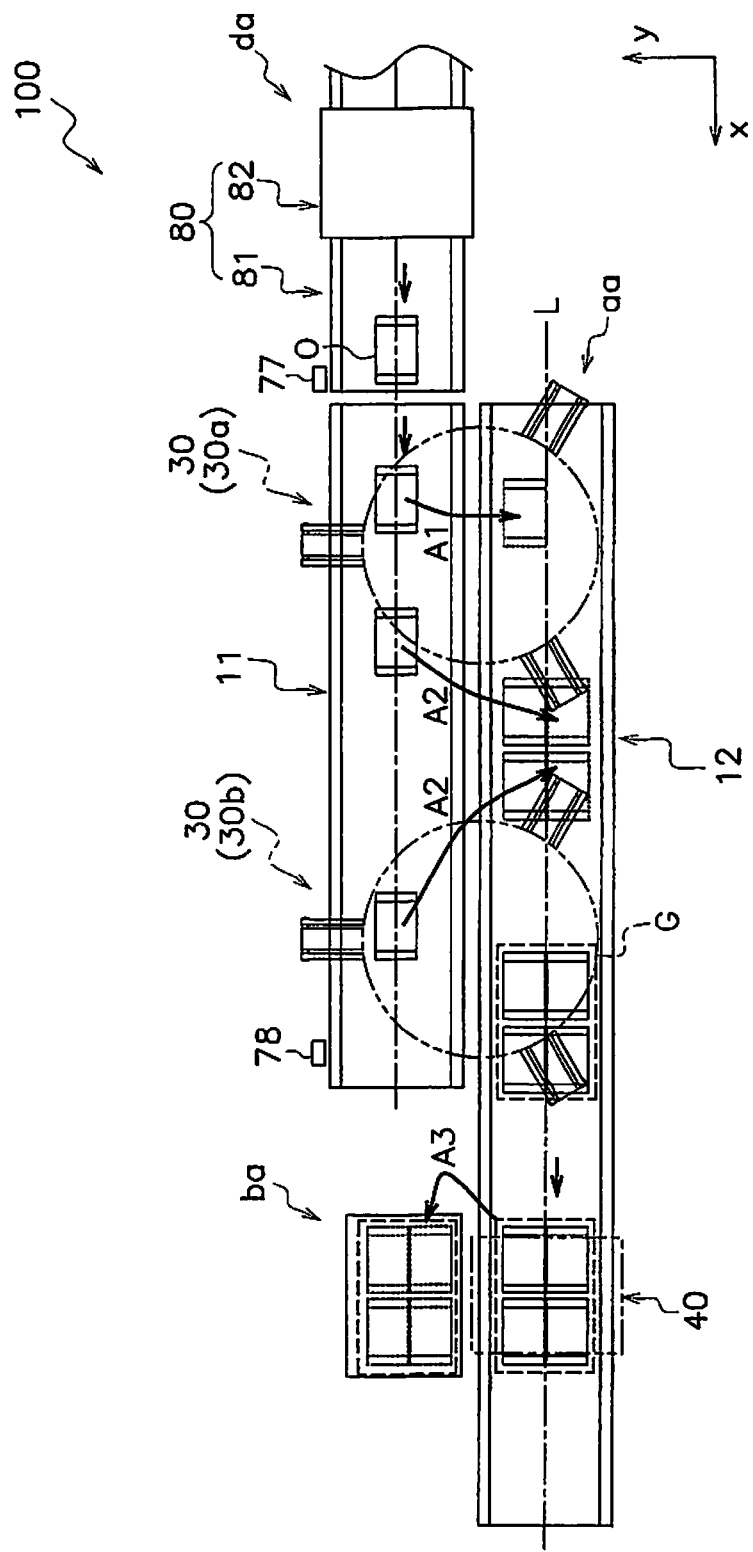
FIG. 1 is a schematic plan view of a suction system according to one embodiment of the present invention.

FIG. 1 is a schematic plan view of a box-packing system 100 according to one embodiment of the present invention. The box-packing system 100 is a system installed in a line of a food plant and packing packages O (articles) produced on the line of the food plant in a box. The package O is a package packaging articles with a packaging material. The packaging material is a soft packaging material such as a film. That is, the package O is a bag filled with articles such as potato chips.

In the line of the food plant, a bag making and packaging machine (not illustrated) and an inspection apparatus (not illustrated) are placed upstream of the box-packing system 100. The bag making and packaging machine produces a package O. That is, the bag making and packaging machine fills articles into a bag while manufacturing the bag. The inspection apparatus inspects the package O for a weight and/or contamination. A package O judged by the inspection apparatus to be satisfactory is conveyed to the box-packing system 100.

As illustrated in FIG. 1, the box-packing system 100 is primarily configured with a seal checker (an evening part) 80, a first conveyor (a conveyance apparatus) 11, a second conveyor 12, first robots (robots) 30, and a second robot 40. Moreover, the box-packing system 100 comprises a control device 70 for controlling the seal checker 80, the first conveyor 11, the second conveyor 12, the first robot 30, and the second robot 40 (see FIG. 9). Individual control devices 70 may be equipped to function for respective components of the seal checker 80, the first conveyor 11, the second conveyor 12, the first robot 30, and the second robot 40. Alternatively, one control device 70 may be equipped with the box-packing system 100 to control each of the components.

The box-packing system 100 is arranged in a final process area of the food plant. As illustrated in FIG. 1, the final process area is primarily divided into a conveyance area da, a box-packing preparation area aa, and a box-packing area ba. The conveyance area da extends in the x axis direction in the face of FIG. 1. The box-packing preparation area aa extends in the x axis direction below the conveyance area da. That is, the box-packing preparation area aa is adjacent to the conveyance area da, and extends in parallel with a conveyance direction of the package O in the conveyance area da. The box-packing area ba is arranged downstream in a conveyance direction of the first conveyor 11 and at a side of a downstream end of the second conveyor 12. The seal checker 80 and the first conveyor 11 are placed in the conveyance area da. The second conveyor 12 is placed in the box-packing preparation area aa. The first robots 30 are arranged in a space above the conveyance area da and the box-packing preparation area aa. A box B for packing is placed in the box-packing area ba. The second robot 40 is arranged in a space above the box-packing preparation area aa and the box-packing area ba.

The package O conveyed from an upstream apparatus (the inspection apparatus) is transferred to the seal checker 80 in the box-packing system 100. A thickness of the package O is evened (leveled and smoothed out) by the seal checker 80, and a sealing defect of the package O is judged by the seal checker 80. Then, the package O is transferred to the first conveyor 11. The first conveyor 11 conveys the package O downstream further. The package O is conveyed by the first conveyor 11 to a predetermined location, and transported to the box-packing preparation area aa by the first robot 30.

Specifically, the first robot 30 carries the package O on a belt of the first conveyor 11 onto a belt of the second conveyor 12 placed on the box-packing preparation area aa, and produces a package group G on the belt of the second conveyor 12. The second conveyor 12 conveys the package group G produced on the belt. The package group G conveyed by the second conveyor 12 is packed in the box B placed in the box-packing area ba by the second robot 40.

(2) Detailed Configuration of Box-Packing System (2-1) Seal Checker

The seal checker 80 judges whether the package O is sealed. That is, the seal checker 80 judges whether a sealing defect of the package O is present. Moreover, the seal checker 80 has the function of evening a thickness of the package O. The seal checker 80 primarily comprises a checker conveyor 81 and a seal check mechanism 82.

The checker conveyor 81 receives and the package O conveyed from the upstream apparatus, and conveys the package O in the x axis direction (see FIG. 1). The checker conveyor 81 is a conveyor belt with an endless belt looped over a drive roller and a driven roller. The checker conveyor 81 conveys the package O in a first orientation. Here, the first orientation is an orientation of the package O conveyed from the upstream apparatus. Specifically, in the present embodiment, the first orientation is an orientation in which upper and lower sealed portions of the package O are oriented upstream and downstream in the conveyance direction, respectively. That is, the first orientation is an orientation in which the vertical direction of the package O extends in the conveyance direction of the checker conveyor 81.

The seal check mechanism 82 is placed at some midpoint of a conveyance path of the checker conveyor 81. The seal check mechanism 82 presses the package O in a thickness direction of the package with a press member. Specifically, the seal check mechanism 82 presses the package O that will be conveyed on the belt of the checker conveyor 81 in the thickness direction to flatly even the entire of the package O and make the thickness of the package O uniform.

Figure 2:
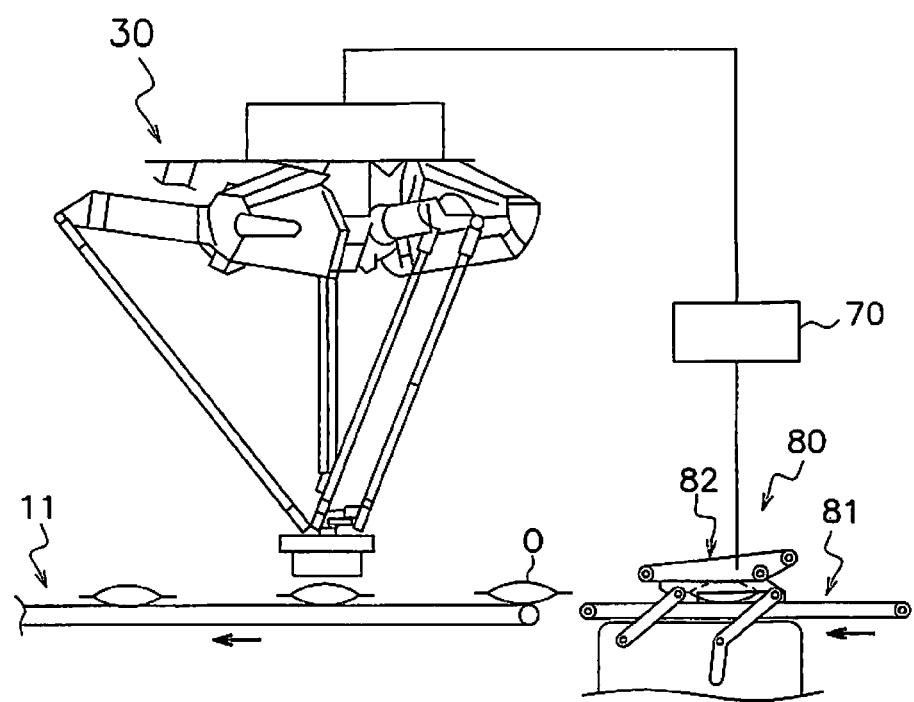
FIG. 2 illustrates a package conveyed from a seal checker to a first conveyor.

The seal check mechanism 82 detects the thickness of the package O while pressing the package. The seal check mechanism 82 detects the thickness of the package O in accordance with the displacement of an angle of a servo-motor (not illustrated) that moves the press member toward and away from the checker conveyor 81. The seal check mechanism 82 judges whether the package O is sealed on the basis of the thickness. That is, the seal check mechanism 82 inspects the bag (the package O) produced of a soft packaging material for a sealing defect. The seal check mechanism 82 sends a signal regarding the thickness (a thickness signal) to the control device 70 (see FIG. 2) when the thickness of the package O is detected.

(2-2) First Conveyor

The first conveyor 11 conveys the package O that has passed the seal checker 80 in the x axis direction (see FIG. 1). The width direction center of the belt of the first conveyor 11 and the width direction center of the belt of the checker conveyor 81 are aligned on a common line. The package O is placed on the width direction center of the belt of the first conveyor 11, and is conveyed.

The first conveyor 11 is a conveyor belt with an endless belt looped over a drive roller and a driven roller. The first conveyor 11 also conveys the package O in the first orientation. That is, the first conveyor 11 maintains the orientation of the package O as when the first conveyor 11 has received the package O from the checker conveyor 81, and conveys the package O downstream. The first conveyor 11 functions as a site for transferring the package O to the first robot 30.

The first conveyor 11 successively conveys packages O. The first conveyor 11 conveys the packages O downstream at a speed of 35 m/min. The packages O are transported to the first conveyor 11 at 100 rpm.

(2-3) Second Conveyor

The second conveyor 12 conveys a plurality of packages O transported by the later-described first robots 30 from the first conveyor 11 in the x axis direction (see FIG. 1). As illustrated in FIG. 1, the second conveyor 12 is placed adjacent to the first conveyor 11. The second conveyor 12 extends in parallel with the direction in which the first conveyor 11 extends. The second conveyor 12 has a longer length than that of the first conveyor 11. Specifically, an upstream-side end portion of the second conveyor 12 is placed in the vicinity of the upstream-side end portion of the first conveyor 11. A downstream-side end portion of the second conveyor 12 is located downstream of the downstream-side end portion of the first conveyor 11 in the conveyance direction.

The second conveyor 12 is a conveyor belt with an endless belt looped over a drive roller and a driven roller in the same manner as the first conveyor 11. The second conveyor 12 also conveys the package O in the first orientation. That is, the second conveyor 12 conveys the package O in the same orientation as when the package O is conveyed by the first conveyor 11. The second conveyor 12 also successively conveys package groups G. The second conveyor 12 conveys the packages O downstream at a speed of 20 m/min.

The second conveyor 12 functions as a site for producing the package group G (a group of articles) made of a predetermined number of packages O. The second conveyor 12 transfers the package group G to the later-described second robot 40. The package group G is produced by the first robots 30 during the conveyance by the second conveyor 12. In the present embodiment, the package group G is made of four packages O. The four packages O are placed in a predetermined arrangement. The predetermined arrangement is an arrangement suitable for packing in a box. Specifically, as illustrated in FIG. 1, the predetermined arrangement is an arrangement in which two packages O in the first orientation are arranged in the width direction and the conveyance direction of the belt of the second conveyor 12. The two packages O arranged in the width direction of the belt are arranged on opposite sides of a referential axis L that passes through the width direction center of the belt, for example. The two packages O arranged in the conveyance direction of the belt are arranged along the referential axis L. Then, the package group G arranged in the predetermined arrangement are moved by the later-described second robot 40 to the box B while maintaining its arrangement, and are packed in the box. That is, the second conveyor 12 is placed in the box-packing preparation area aa, and is used to prepare the package group G to be packed in the box B.

(2-4) First Robot

The first robot 30 applies suction and holds the package O conveyed by the first conveyor 11, and transports the package to the box-packing preparation area aa. Specifically, the first robot 30 applies suction and holds the package O that has been conveyed to a predetermined location of the first conveyor 11, and transports the package to a predetermined location of the second conveyor 12. Moreover, the first robot 30 places the package O conveyed by the first conveyor 11 at a predetermined location of the belt of the second conveyor 12, and thereby produces the package group G made of the plurality of packages O placed in the above-described predetermined arrangement on the belt of the second conveyor 12. As described above, on the belt of the second conveyor 12, two packages O in the first orientation are placed in the width direction and the conveyance direction, and the package group G is thereby produced (see FIG. 1). That is, the first robot 30 arranges the plurality of packages O in the box-pack placement on the belt of the second conveyor (the box-packing preparation area aa). The first robot 30 is driven on the basis of a command from the later-described control device 70.

The first robot 30 is configured with an upstream-side first robot 30a placed upstream and a downstream-side first robot 30b placed downstream. A planar movable range of the upstream-side first robot 30a is an area in upstream sides of the first conveyor 11 and the second conveyor 12. Moreover, a planar movable range of the downstream-side first robot 30b is an area in a downstream side of the upstream-side first robot 30a in the first conveyor 11 and the second conveyor 12. Specifically, the upstream-side first robot 30a applies suction to the package O conveyed by the first conveyor 11 at a predetermined location on the upstream side of the first conveyor 11. The downstream-side first robot 30b applies suction to the package O conveyed by the first conveyor 11 at a predetermined location on the downstream side of the upstream-side first robot 30a.

The upstream-side first robot 30a places a package O on the belt of the first conveyor 11 in the first orientation onto a width direction front portion of the belt of the second conveyor 12 (see arrow A1 in FIG. 1). The width direction front portion of the belt of the second conveyor 12 is a front side portion based on the first conveyor 11. That is, the width direction front portion of the belt of the second conveyor 12 is a portion of the second conveyor 12 close to the first conveyor 11 relative to the referential axis L. The upstream-side first robot 30a arranges two packages O along the referential axis L at the predetermined location of width direction front portion of the belt of the second conveyor 12.

The downstream-side first robot 30b places a package O on the belt of the first conveyor 11 in the first orientation onto a width direction rear portion of the belt of the second conveyor 12 (see arrow A2 in FIG. 1). The width direction rear portion of the belt of the second conveyor 12 is a rear portion based on the first conveyor 11. That is, the width direction rear portion of the belt of the second conveyor 12 is a portion of the second conveyor 12 distant from the first conveyor 11 relative to the referential axis L. The downstream-side first robot 30b arranges two packages O at the predetermined location of the width direction rear portion of the belt of the second conveyor 12 along the referential axis L.

The upstream-side first robot 30a and the downstream-side first robot 30b alternately applies suction and holds the plurality of packages O successively conveyed by the first conveyor 11. That is, the upstream-side first robot 30a and the downstream-side first robot 30b apply suction and hold every other package O successively conveyed by the first conveyor 11. Specifically, the upstream-side first robot 30a transports a package (a first package) O on the belt of the first conveyor 11, and then the downstream-side first robot 30b transports a package (a second package) O conveyed directly behind the package (the first package) O. Moreover, the upstream-side first robot 30a transports a package (a third package) O conveyed directly behind the package (the second package) O transported by the downstream-side first robot 30b.

The configuration of the upstream-side first robot 30a is same as that of downstream-side first robot 30b. Hereinafter, the configurations of the upstream-side first robot 30a and the downstream-side first robot 30b will be described as the configuration of the first robot 30 in detail.

The first robot 30 is a parallel link robot. As illustrated in FIG. 3, the first robot 30 primarily comprises a base 32, three arms 34a, 34b, and 34c, the three servomotors 33a, 33b, and 33c, a suction movement part 50, and a suction hose 56.

(2-4-1) Base

As illustrated in FIG. 3, the base 32 supports from above an upper end portion of the first robot 30. Specifically, the base 32 is rigidly and fixedly attached to a support structure (not shown) located above the base 32. The later-described three servomotors 33a, 33b, and 33c are attached to a lower portion of the base 32 at equal spacings. The base 32 is placed in a space above the first conveyor 11 and the second conveyor 12 (see FIG. 1).

(2-4-2) Arm and Servomotor

The three arms 34a, 34b, and 34c are driven by the three servomotors 33a, 33b, and 33c, respectively. Each of the arms 34a, 34b, and 34c is configured with two arms (a first arm UA and a second arm LA). The first arm UA is an arm located above. The second arm LA is an arm located below. An upper end of the first arm UA is coupled to an output shaft of each of the servomotors 33a, 33b, and 33c. An upper end of the second arm LA is rotatably coupled to a lower end of the first arm UA. The lower end of the second arm LA is coupled to the suction movement part 50. That is, the arms 34a, 34b, and 34c, respectively, extend from the output shafts of the servomotors 33a, 33b, and 33c to the suction movement part 50. Moreover, the arms 34a, 34b, and 34c couple the base 32 to the suction movement part 50.

An amount of rotation and a direction of rotation of each of the output shafts of each of the servomotors 33a, 33b, and 33c are controlled suitably, and the lower ends of the arms 34a, 34b, and 34c (the lower ends of the second arm LA) thereby move in the horizontal direction and the vertical direction (the up-down direction). The lower ends of the arms 34a, 34b, and 34c moves in the horizontal direction and the vertical direction, and thereby moving the later-described suction movement part 50 attached to the lower ends of the second arm LA in the horizontal direction and the vertical direction. The arms 34a, 34b, and 34c, respectively, are driven by the servomotors 33a, 33b, and 33c in order for the suction movement part 50 to apply suction to the package O at a predetermined vertical location. Here, the predetermined vertical location is a vertical location determined by a later-described determination part 73 of the control device 70.

(2-4-3) Suction Movement Part

The suction movement part 50 applies suction the package O. Moreover, the suction movement part 50 moves in the horizontal direction and the vertical direction in a state in which the suction movement part applies suction the package O. The suction movement part 50 moves in accordance with a conveyance situation of the package O in which the package O is conveyed by the first conveyor 11. As described above, the arms 34a, 34b, and 34c are driven, and the suction movement part 50 thereby moves in the horizontal direction and the vertical direction.

Specifically, the lower ends of the arms 34a, 34b, and 34c move in the horizontal direction and the vertical direction, and the suction movement part 50 is thereby configured to be able to move to any location in a given three-dimensional space. The suction movement part 50 is driven so as to apply suction to the package O at the predetermined location of the first conveyor 11 and release the suction of the package O at the predetermined location of the second conveyor 12. The suction movement part 50 is primarily configured with a coupling part 51 and a suction head 52.

(a) Coupling Part

The coupling part 51 is a part for coupling the suction hose 56 and the suction head to the lower ends of the arms 34a, 34b, and 34c. The coupling part 51 is attached to the lower ends of the arms 34a, 34b, and 34c via a slide part 512 (see FIGS. 6 and 7). The slide part 512 enables the coupling part 51 to rotate and slide with respect to the lower ends of the arms 34a, 34b, and 34c. The slide part 512 enables the coupling part 51 and components (the suction hose 56 and the like) connected to the coupling part 51 to be integrally detached from the lower ends of the arms 34a, 34b, and 34c.

Figure 6:
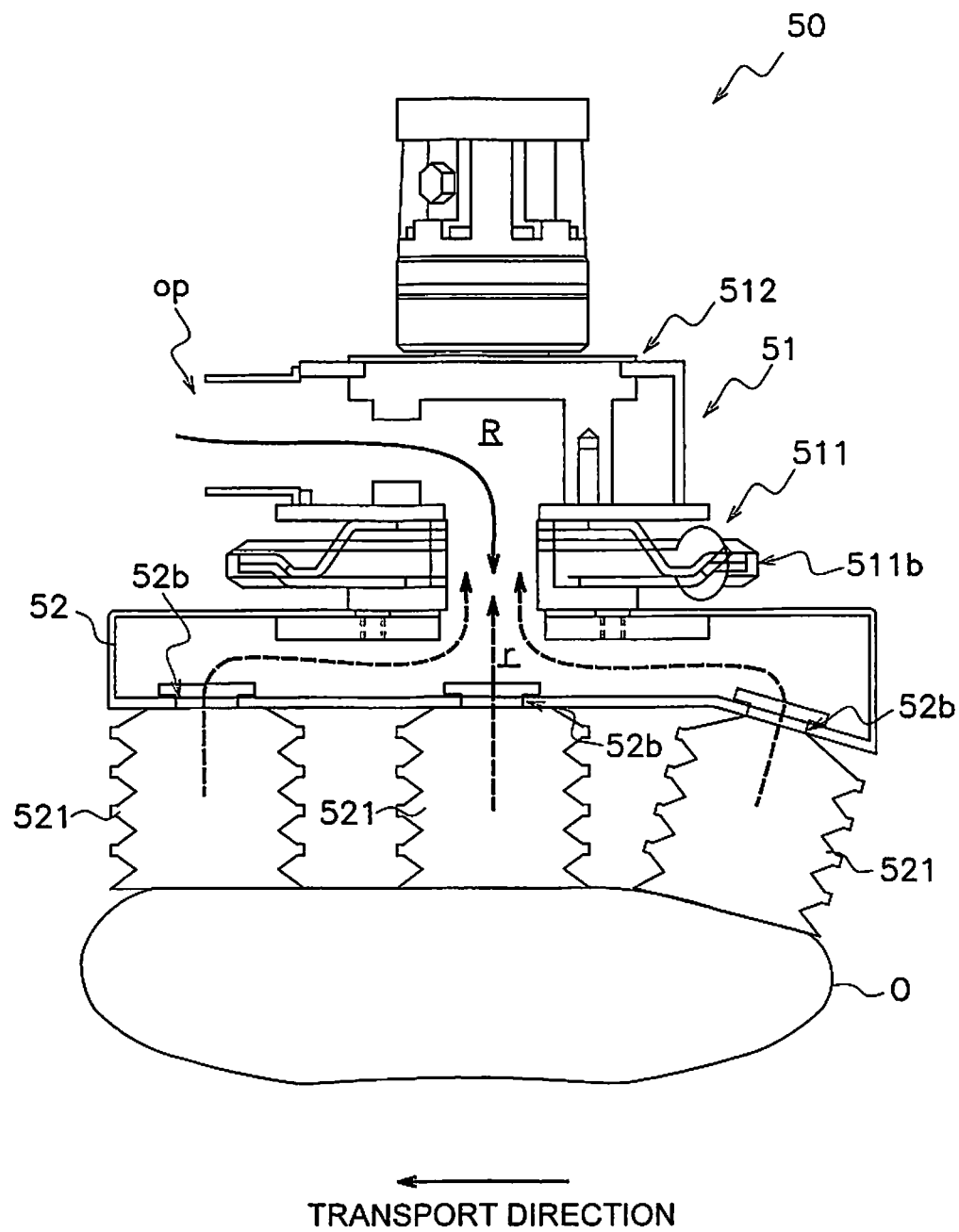
FIG. 6 is a schematic cross-sectional view of the suction movement part, and illustrates a state in which the suction head is attached to a suction hose coupling part.

As illustrated in FIG. 3, the coupling part 51 has a shape similar to a circular cylinder. As illustrated in FIG. 6, the coupling part 51 has an internal space R. An opening op for coupling the suction hose 56 is arranged in an outer circumference portion of the coupling part 51. A hole 51a for communicating with an internal space r of the suction head 52 is formed at the lower end of the coupling part 51 (see FIGS. 4 and 7).

Figure 7:
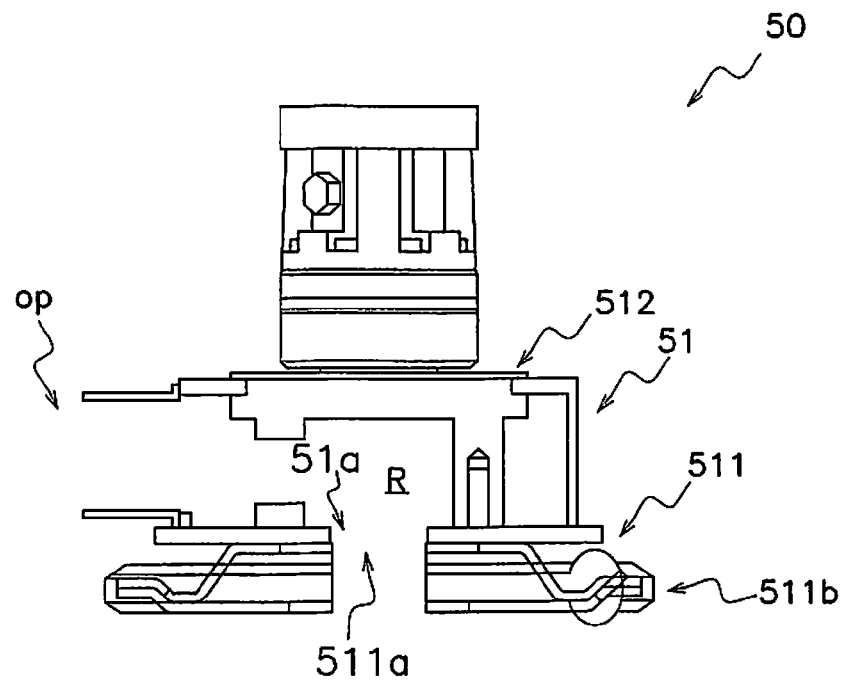
FIG. 7 is a schematic cross-sectional view of the suction movement part, and illustrates a state in which the suction head is detached from the suction hose coupling part.
Figure 7:
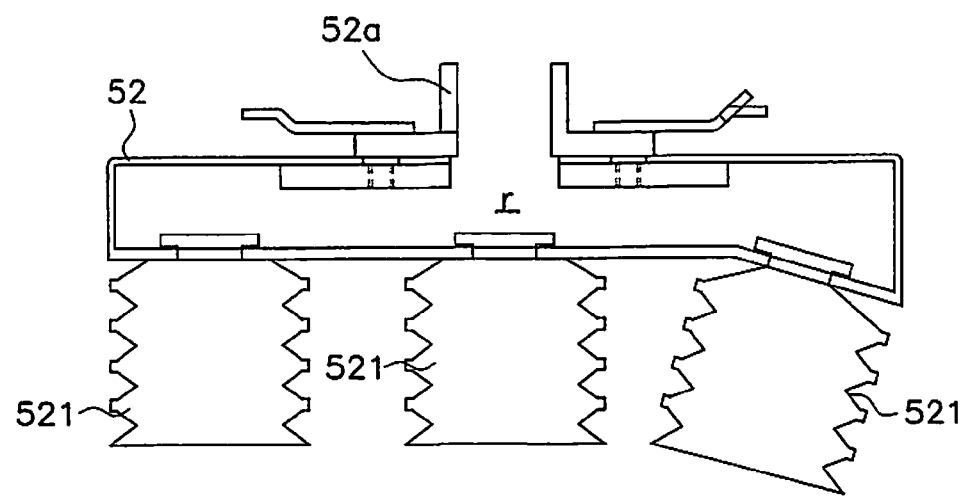

As illustrated in FIGS. 6 and 7, an attachment part 511 is arranged at the lower end of the coupling part 51. The attachment part 511 is a mechanism for attaching the suction head 52 to the coupling part 51. The attachment part 511 couples the suction head 52 to the coupling part 51 with a ferrule structure (see FIGS. 4 and 5). Moreover, the attachment part 511 has a locking mechanism 511b. The locking mechanism 511b secures the suction head 52 to the lower end of the coupling part 51. The locking mechanism 511b is released, the suction head 52 rotates and slides with respect to the attachment part 511, and the coupling part 51 and the components connected to the coupling part 51 are thereby detached from the suction head 52.

Figure 4:
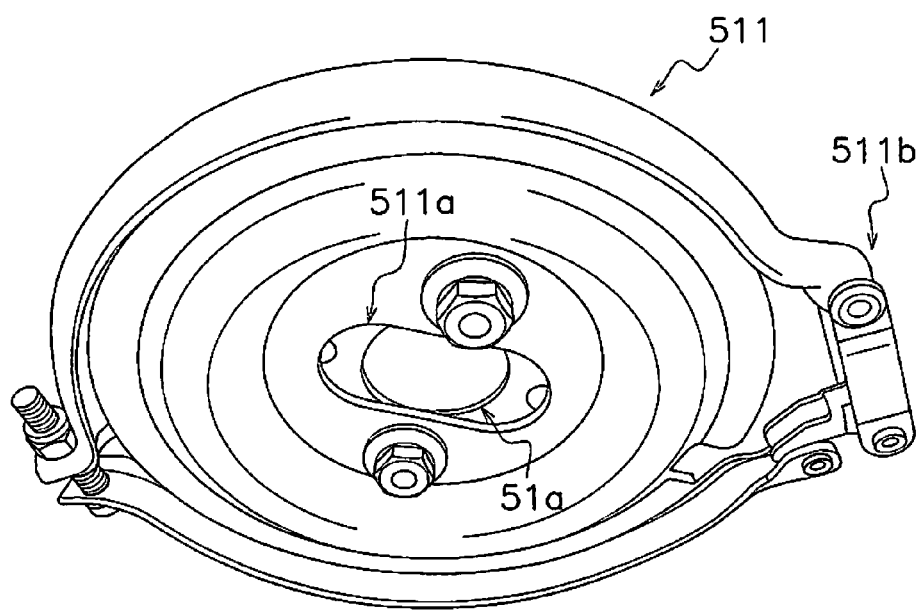
FIG. 4 is a perspective view of a bottom surface of a suction movement part in a state in which a suction head is detached from the suction movement part.

As illustrated in FIG. 4, the attachment part 511 has a circular shape. The attachment part 511 has a hole 511a in the central portion of the attachment part. The hole 511a of the attachment part 511 is arranged at a location in which the hole 511a and the hole 51a of the coupling part 51 overlap. The suction head 52 is secured to the lower end of the coupling part 51, and the internal space R of the coupling part 51 thereby communicates with the internal space r of the suction head 52.

(b) Suction Head

The suction head 52 is attached to the lower ends of the arms 34a, 34b, and 34c via the coupling part 51. The suction head 52 is made of a rectangle top surface, a rectangle bottom surface, and side surfaces placed between the top surface and the bottom surface. The top surface, the bottom surface, and the side surfaces form the internal space r (see FIGS. 6 and 7). In the present embodiment, the long side direction of the top surface and the bottom surface is placed along the longitudinal direction of the package O. That is, the long side direction of the top surface and bottom surface extends in the conveyance direction of the first conveyor 11 and second conveyor 12 (the x axis direction), and the short side direction of the top surface and the bottom surface extends in a direction intersecting the conveyance direction of the first conveyor 11 and second conveyor 12 (the y axis direction). Here, the direction intersecting the conveyance direction of the first conveyor 11 and second conveyor 12 is a transport direction of the package O by the first robot 30 (see FIGS. 1 and 6).

The bottom surface of the suction head 52 is configured with a horizontal surface extending in the horizontal direction and an inclination surface inclined relative to the horizontal surface (see FIGS. 6 and 7). The inclination surface is located at a rear side in the transport direction of the package O by the first robot 30. That is, the inclination surface is a portion of the bottom surface located at a rear side in the transport direction when the first robot 30 transports the package O to the second conveyor 12. The horizontal surface is a portion of the bottom surface located at a front side in the transport direction.

Moreover, the suction head 52 has a communication opening 52a and a plurality of openings 52b (see FIG. 7). The communication opening 52a and the plurality of openings 52b allow the internal space r and an external space to communicate with each other. The communication opening 52a is arranged in the top surface of the suction head 52. The plurality of openings 52b is arranged in the bottom surface of the suction head 52.

Figure 5:
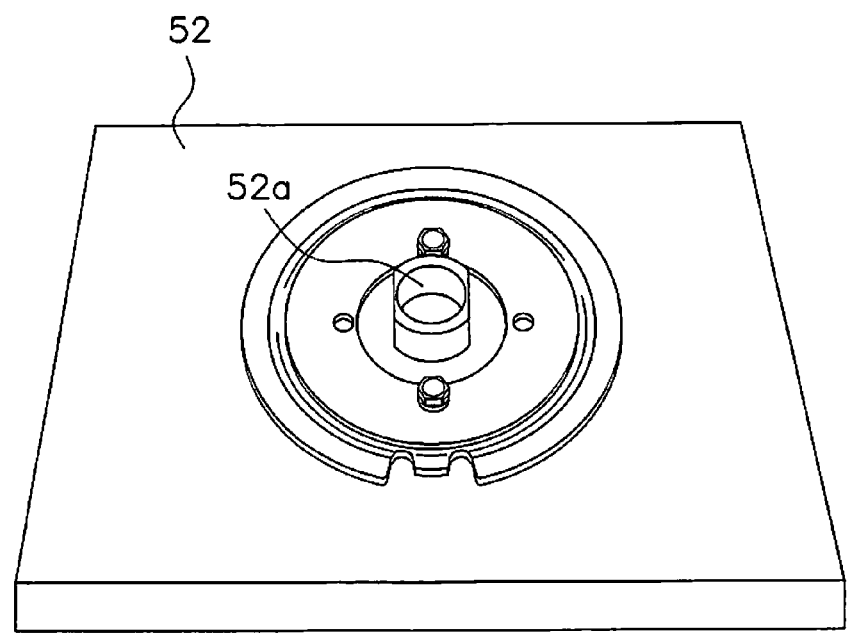
FIG. 5 is a perspective view of a top surface of a suction head detached from the suction movement part.

The communication opening 52a is a pipe protruding above (see FIG. 5). The communication opening 52a is inserted into the hole 51a of the coupling part 51 via the hole 511a of the attachment part 511. The communication opening 52a thereby functions as a pipe for allowing the internal space r in the suction head 52 and the internal space R in the coupling part 51 to communicate with each other.

A suction part 521 is attached to each of the openings 52b. The suction part 521 is a portion (a suction cup) that contacts the package O. The suction part 521 is made of an elastic member. Specifically, the suction part 521 is made of rubber. In the present embodiment, fifteen suction parts 521 are attached to the suction head 52. Specifically, five suction parts 521 are attached in the long side direction of the suction head 52. Moreover, three suction parts 521 are attached in the short side direction of the suction head 52 (see FIGS. 3, 6, and 7). Five suction parts 521 of the suction head 52 arranged in the long side direction contact the package O in the longitudinal direction of the package O (i.e., the x axis direction). Moreover, three suction parts 521 arranged in the short side direction of the suction head 52 contact the package O in the transverse direction of the package O (i.e., the y axis direction).

Each of the suction parts 521 is designed so that a central axis of the suction part 521 extending in the length direction of the suction part 521 is orthogonal to the surface of the package O which each suction part 521 contacts when the suction part 521 applies suction the package O. Each of the suction parts 521 includes horizontal suction parts 521a and inclination suction parts 521b.

The horizontal suction part 521a is a suction part 521 attached to the horizontal surface of the suction head 52. In the present embodiment, as illustrated in FIG. 6, two horizontal suction parts 521a are placed in front of the inclination suction part 521b in the transport direction (movement direction). An opening of the horizontal suction part 521a that contacts the package O is parallel to a referential surface orthogonal to the vertical direction.

The inclination suction part 521b is a suction part 521 attached to the inclination surface of the suction head 52. The inclination suction part 521b is located behind the horizontal suction parts 521a in the transport direction of the package O relative to the horizontal suction part 521a. An opening of the inclination suction part 521b is inclined relative to the referential surface orthogonal to the vertical direction. Specifically, the inclination suction part 521b is the rearmost suction part in the transport direction. A leading-side vertical location of the opening of the inclination suction part 521b in the transport direction is substantially same as a vertical location of the opening of the horizontal suction part 521a. Moreover, a trailing-side vertical location of the opening of the inclination suction part 521b in the transport direction is lower than the leading-side vertical location of the opening of the inclination suction part 521b in the transport direction. The inclination suction part 521b is inclined relative to the horizontal surface so as to be arranged along the outside shape of the package O. Specifically, the inclination suction part 521b is inclined relative to the horizontal surface so as to be arranged along the surface of a side of the package O.

The suction movement part 50 is configured to switch between a state in which the suction movement part applies suction the package O (a suction state) and a state in which the suction movement part does not apply suction to the package O (a non-suction state). The suction state and the non-suction state are switched when a later-described two-way valve 56b and a three-way valve 57b are opened and closed (see FIG. 8). The suction movement part 50 in the suction state enables the suction parts 521 to apply suction and hold the package O. On the other hand, the suction movement part 50 in the non-suction state does not enable the suction parts 521 to apply suction and hold the package O. That is, the suction movement part 50 switches between the suction state and the non-suction state to hold and release the package O.

(2-4-4) Suction Hose

The suction hose 56 is coupled to a vacuum pump (a suction blower) 56a, and applies suction to and holds the package O (see FIG. 8). That is, the suction hose 56 connects the vacuum pump 56a to the suction movement part 50. As illustrated in FIG. 8, the two-way valve 56b is attached to the suction hose 56. When the two-way valve 56b is opened, a vacuum is created in the suction hose 56, and the suction movement part 50 thereby switches to the suction state.

An air-compression-usage tube 57 is arranged in the internal space of the suction hose 56 (see FIG. 8). The air-compression-usage tube 57 is used to send compressed air for forcibly performing breaking suction (breaking vacuum). The air-compression-usage tube 57 has a smaller diameter than that of a suction hose 56.

As illustrated in FIG. 8, the air-compression-usage tube 57 extends from a compressed-air supply part 57a and an air-compression-usage tank 57c. The compressed-air supply part 57a is a source supplying compressed air (high pressure air). The air-compression-usage tank 57c temporarily accumulates compressed air supplied from the compressed-air supply part 57a. The air-compression-usage tank 57c accumulates compressed air having an amount used for breaking vacuum once. The three-way valve 57b is attached to the compressed-air supply part 57a, the air-compression-usage tank 57c, and the air-compression-usage tube 57. When the opening and closing of valves of the three-way valve 57b are switched, compressed air is sent from the compressed-air supply part 57a to the air-compression-usage tank 57c, or from the air-compression-usage tank 57c into the air-compression-usage tube 57. When the suction movement part 50 switches to the non-suction state, compressed air is sent from the air-compression-usage tank 57c to the air-compression-usage tube 57, and compressed air is blown out of the suction parts 521 to the package O.

In detail, when the two-way valve 56b connecting the vacuum pump 56a to the suction hose 56 is opened and the three-way valve 57b connecting the air-compression-usage tank 57c to the air-compression-usage tube 57 is closed, the suction movement part 50 switches to a state in which the suction movement part is able to apply suction to the package O (the suction state). At this time, the suction movement part 50 applies suction to the package O with the plurality of suction parts 521. On the other hand, when the two-way valve 56b connecting the vacuum pump 56a to the suction hose 56 is closed and the three-way valve 57b connecting the air-compression-usage tank 57c to the air-compression-usage tube 57 is opened, the suction movement part 50 switches to a state in which the suction movement part is not able to apply suction to the package O (the non-suction state). At this time, the suction movement part 50 releases the suction of the package O with the plurality of the suction parts 521 at a high speed.

The suction hose 56 is arranged in a direction in which the arms 34a, 34b, and 34c extend. The suction hose 56 is placed in an interior angle between the first arm UA and the second arm LA. In the present embodiment, an example of the suction hose 56 arranged inside the arm 34b is described. The suction hose 56 is fastened to the first arm UA and the second arm LA with a fastening member 562 and a fastening member 561, respectively.

(2-5) Second Robot

The second robot 40 applies suction and holds the package group G conveyed by the second conveyor 12 to the box-packing area ba. Specifically, thy second robot 40 packs the plurality of packages O arranged in the box-pack placement on the belt of the second conveyor 12 into the box B. The second robot 40 is also driven in accordance with a command from the later-described control device 70.

The second robot 40 has a suction part (not illustrated) and a suction hose (not illustrated). The suction hose is coupled to a vacuum pump (a suction blower). The second robot 40 is configured to be able to move in the y axis direction and a z axis direction. The second robot 40 moves in the y axis direction and the z axis direction to vary a planar location and a vertical location of the suction part (see FIG. 1). The y axis direction is a direction orthogonal to the conveyance direction of the box-packing system 100 (the x axis direction). The z axis direction is a depth direction in the face of FIG. 1. In other words, the z axis direction refers to the vertical direction (the up-down direction).

Specifically, the second robot 40 waits at a predetermined location above the second conveyor 12. When second conveyor 12 conveys the package group G to the predetermined location, the second robot 40 moves to a lower location, and applies suction to the package group G with a suction part. Then, the second robot 40 moves to an upper location. Furthermore, the second robot 40 moves in the y axis direction and moves the package group G above the box B (see arrow A3 in FIG. 1). Then, second robot 40 moves downward, transports the package group G into the box B, and releases the suction.

(2-6) Control Device

The control device 70 controls the operations of the seal checker 80, the first conveyor 11, the second conveyor 12, the first robot 30, and the second robot 40, as described above. Information and programs needed to operate each of components in the box-packing system 100 are stored in the control device 70. Specifically, the information stored in the control device 70 includes information regarding a drive speed of each component, the predetermined location on the belt of the first conveyor 11 at which the first robot 30 applies suction to the package O, and the predetermined location on the belt of the second conveyor 12 at which the first robot 30 releases the suction of the package O. Moreover, the information stored in the control device 70 includes information regarding the predetermined location on the belt of the second conveyor 12 at which the second robot 40 applies suction to the package group G and the predetermined location (a location of the box B) at which the second robot 40 releases the suction of the package group G.

Figure 9:
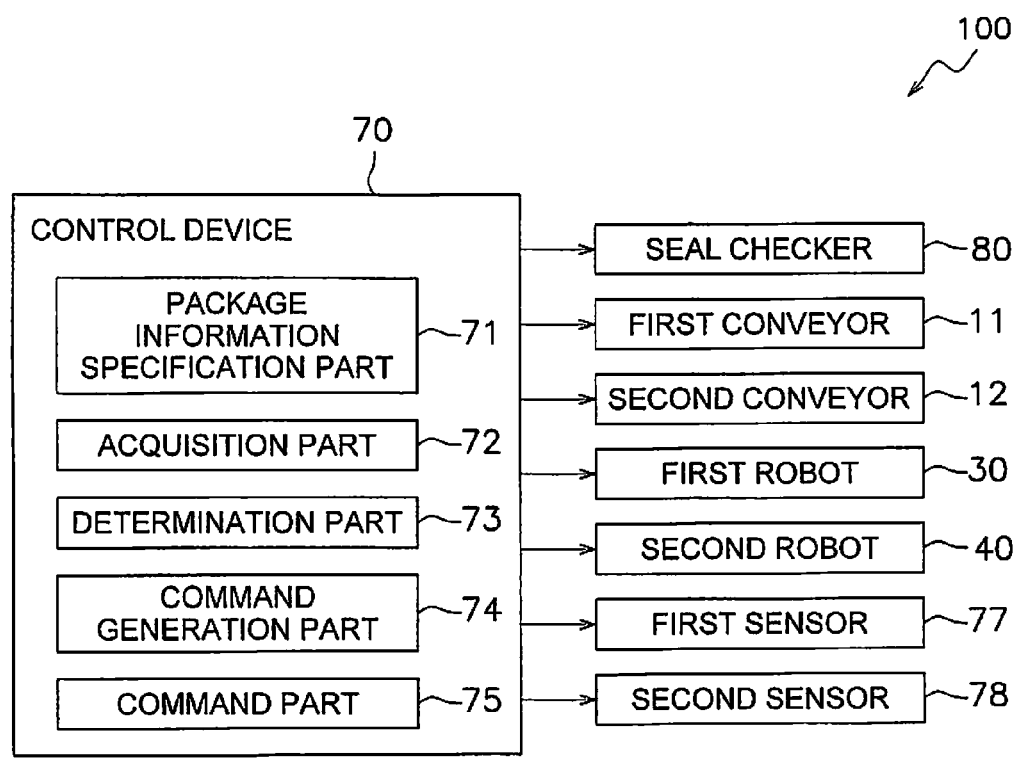
FIG. 9 is a control block diagram.

The control device 70 is configured with a CPU, ROM, and RAM. FIG. 9 illustrates a control block of the control device 70. The control device 70 is electrically connected to each component in the box-packing system 100, and sends and receives signals between each component.

Specifically, the control device 70 controls the first conveyor 11 and the second conveyor 12 to convey the packages O downstream.

Moreover, the control device 70 controls the two first robots 30 (the upstream-side first robot 30a and the downstream-side first robot 30b) to move the package O on the belt of the first conveyor 11 to the box-packing preparation area aa. Specifically, the control device 70 drives the first robots 30 to allow the first robots 30 to apply suction to and hold the packages O at the predetermined locations on the belt of the first conveyor 11, move the packages O onto the predetermined locations on the belt of the second conveyor 12, and thereby produces the package group G made of the predetermined number of packages O on the belt of the second conveyor 12. That is, the control device 70 suitably controls an amount of rotation and a direction of rotation of each output shaft of each of the servomotors 33a, 33b, and 33c to drive the arms 34a, 34b, and 34c, and thereby varies a planar location and a vertical location of the suction movement part 50. Thereby, the package group G is produced in the box-packing preparation area aa.

Moreover, the control device 70 controls the second robot 40 to move the package group G on the belt of the second conveyor 12 to the box-packing area ba. That is, the control device 70 controls the second robot 40 to pack the package group G on the belt of the second conveyor 12 into the box B.

Furthermore, the control device 70 is electrically connected to a first sensor 77 and a second sensor 78. Both of the first sensor 77 and the second sensor 78 are installed at proper sites. The first sensor 77 and the second sensor 78 perceive a timing at which the package O passes at the proper sites. In the present embodiment, as illustrated in FIG. 1, the first sensor 77 is placed in the vicinity of a downstream-side end portion of the checker conveyor 81, and the second sensor 78 is placed in the vicinity of a downstream-side end portion of the first conveyor 11.

Moreover, the control device 70 functions as the package information specification part 71, the acquisition part 72, the determination part 73, a command generation part 74, and a command part 75.

(2-7-1) Package Information Specification Part

The package information specification part 71 specifies the number of packages O and a site of a leading package O conveyed by the first conveyor 11 (a location on the belt of the first conveyor 11) on the basis of information obtained by the first sensor 77. Moreover, the package information specification part 71 specifies a site of the package group G conveyed by the second conveyor 12 (a location on the belt of the second conveyor 12) on the basis of information obtained by the second sensor 78. Information stored by the package information specification part 71 is stored in the control device 70, and is updated.

(2-7-2) Acquisition Part

The acquisition part 72 acquires thickness information of the package O from the seal checker 80. Specifically, the acquisition part 72 acquires the thickness information of the evened package O on the basis of the thickness signal sent from the seal checker 80. The acquisition part 72 acquires the thickness information, associates this thickness information with information regarding the package O relating to the thickness information, and stores the control device 70. That is, thickness information regarding each package O conveyed by the first conveyor 11 is associated with each package O, and is stored.

(2-7-3) Determination Part

The determination part 73 determines a predetermined vertical location at which the first robot 30 applies suction to the package O on the basis of the thickness information stored in the control device 70. Here, the predetermined vertical location refers to a vertical location at which the suction movement part 50 applies suction to the package O on the belt of the first conveyor 11. That is, on the basis of the predetermined vertical location, the amount by which the suction movement part 50 moves downward in the vertical direction is determined when the first robot 30 applies suction to the package O. The determination part 73 determines a predetermined vertical location corresponding to each package O on the basis of the thickness information of each package O stored in the control device 70. Information regarding the predetermined vertical location determined by the determination part 73 is associated with information regarding a corresponding package O, and is stored in the control device 70.

(2-7-4) Command Generation Part

The command generation part 74 generates commands for driving the seal checker 80, the first conveyor 11, the second conveyor 12, the first robot 30, and the second robot 40 on the basis of the information stored in the control device 70. The commands generated by the command generation part 74 include a first command, a second command, and a third command to the first robot 30.

The first command is a command for moving the suction movement part 50 to the predetermined vertical location to allow the suction movement part 50 to apply suction to the package O. Specifically, the command generation part 74 generates a command for driving the servomotors 33a, 33b, and 33c of the first robot 30 on the basis of the predetermined vertical location. In other words, the command generation part 74 generates a command to allow the first robot 30 to apply auction to the package O on the belt of the first conveyor 11 at the predetermined vertical location determined by the determination part 73.

The second command is a command for moving the suction movement part 50 in the horizontal direction to move the package O to the box-packing preparation area aa in a state in which the package is held by suction applied by the suction movement part 50. Specifically, the command generation part 74 drives the servomotors 33a, 33b, and 33c of the first robot 30 to move the suction movement part 50 to a predetermined location on the belt of the second conveyor 12. Here, the predetermined location on the belt of the second conveyor 12 is a location at which the package group G is produced. That is, this predetermined location is a location at which a plurality of packages O are collected and arranged.

The third command is a command for releasing the suction state of the package O that has been moved to the box-packing preparation area aa.

Furthermore, the command generation part 74 generates a command (a fourth command) for allowing the second robot 40 to apply suction to and hold the package group G and move the package group to the box B. Specifically, the fourth command is a command for allowing the second robot 40 to move to a lower location, apply suction to the package group G on the belt of the second conveyor 12, move the package group G into the box B in a state in which the package group G is held by suction, and release the suction state of the package group G in the box B.

(2-7-5) Command Part

The command part 75 allows the first robot 30 to perform the first, second, and third commands to produce the package group G in the box-packing preparation area aa. Moreover, the command part 75 allows the second robot 40 to perform the fourth command to move the package group G to the box-packing area ba.

(3) Features (3-1)

The box-packing system 100 according to the above embodiment comprises the first conveyor (the conveyance apparatus) 11, the first robots (the robots) 30, and the control device 70. The first robots 30 apply suction, hold, and transport packages (article) O. Articles are packaged with a soft packaging material, and are conveyed by the first conveyor 11. The control device 70 controls the first robots 30 to move the packages O to the box-packing preparation area aa. Moreover, the first robots 30 have the suction parts 521, the arms 34a, 34b, and 34c, and the servomotors (drive parts) 33a, 33b, and 33c. The suction parts 521 apply suction to the package O from above. The arms 34a, 34b, and 34c are able to move the suction parts 521 in the horizontal direction and the vertical direction. The servomotors 33a, 33b, and 33c drive the arms 34a, 34b, and 34c in order for the suction parts 521 to apply suction to the package O at a predetermined vertical location. Moreover, the control device 70 has the acquisition part 72, the determination part 73, and the command generation part 74. The acquisition part 72 acquires thickness information of the package O. The determination part 73 determines the predetermined vertical location on the basis of the thickness information. The command generation part 74 generates a command for driving the servomotors 33a, 33b, and 33c on the basis of the predetermined vertical location determined by the determination part 73.

In order to achieve the acceleration of a packing process, a plurality of components that a box-packing system includes need to operate at a high speed. However, in the case in which a package is, held by suction, and transported by a robot in the box-packing system, and if the robot operates at a high speed, the robot may not be able to securely apply suction to and hold an article with suction parts. Specifically, in the case in which the robot applies suction to a package at a predetermined vertical location, and then transports the package in the horizontal direction in the same manner as the first robot 30 according to the above embodiment, and if the suction parts are insufficiently in contact with the package and do not sufficiently apply suction to the package during the suction, the package cannot endure high-speed transportation by the suction parts. The package cannot keep pace with the movement of the suction parts due to inertia, and may fall off the suction parts, for example. Consequently, it may be difficult to achieve the acceleration of a packing process.

However, with the box-packing system 100 according to the above embodiment, the vertical location at which the suction parts 521 applies suction to the package is determined on the basis of the thickness information of the package. The arms 34a, 34b, and 34c are driven on the basis of the determined information. The suction part 521 thereby securely applies suction to the package O. Therefore, the package O is able to avoid falling off the suction parts if the package is transported at a high speed. Consequently, the acceleration of a packing process is able to be achieved.

(3-2)

The box-packing system 100 according to the above embodiment further comprises the seal checker (the evening part) 80. The seal checker 80 flatly evens the article (the package O) packaged with the soft packaging material with the seal check mechanism 82. The acquisition part 72 acquires the thickness information after the package O was evened by the seal checker 80. Appropriate thickness information of a package held by suction by the suction part 521 is thereby able to be acquired.

In the same manner as the package O of the above embodiment packed in a bag, an article packaged with a soft packaging material (articles in a bag) does not have a uniform thickness. If the plurality of suction parts apply suction to a package not having a uniform thickness, some suction parts securely apply suction to the package while other suction parts do not apply suction to the package. In such a state, the suction force of the suction parts cannot be ensured sufficiently.

However, in the same manner as the box-packing system 100 according to the above embodiment, when the seal checker 80 measures the thickness of the package O evened by the thickness of the package O, appropriate thickness information for enabling the suction parts 521 to reliably apply suction is able to be acquired. A suction process of the package O is performed on the basis of the appropriate thickness. Therefore, each of the suction parts securely applies suction to the package O.

(3-3)

In the box-packing system 100 according to the above embodiment, the seal checker (the evening part) 80 has the seal check mechanism 82. The seal check mechanism 82 inspects a bag (the package O) produced of the soft packaging material for a sealing defect. Specifically, the seal check mechanism 82 presses the package O in the thickness direction of the package O, evens the thickness of the package O, and judges whether the package O is sealed on the basis of the thickness detected during the pressing and evening. The package O is thereby able to be judged to be satisfactory before the package O is packed into a box.

(3-4)

In the box-packing system 100 according to the above embodiment, the first robots (robots) 30 arrange the packages O (the articles) in the box-pack placement in the box-packing preparation area aa. Then, the packages O arranged in the box-pack placement are packed in the box B by the second robot 40. Thereby, the efficiency of the packing process is thereby able to be improved.

(3-5)

Moreover, in the box-packing system 100 according to the above embodiment, the command generation part 74 generates the first and second commands. The first command is a command for moving the suction parts 521 to the predetermined vertical location to apply suction to the package (the article) O with the suction parts 521. The second command is a command for moving the suction parts 521 in the horizontal direction to move the package O to the box-packing preparation area aa in a state in which the package O is held by suction by the suction parts 521. Locations of the suction part 521 in the vertical direction are adjusted. After the package O has suction applied and is held by the suction parts 521, the package O is moved in the horizontal direction, and is carried to the box-packing preparation area aa. The package O is thereby held by suction at the predetermined vertical location which corresponds to the thickness of the package O. Consequently, the suction parts 521 securely apply suction to the package O, and maintains the suction state of the package O during the horizontal movement.

(4) Modification (4-1) Modification A

In the above embodiment, conveyor belts are used as the first conveyor 11 and the second conveyor 12. However, as the first conveyor 11 and the second conveyor 12, roller conveyors with aligned multiple rollers and no belts may be used.

(4-2) Modification B

In the above embodiment, the first robot 30 generates the package group G made of four packages O in a predetermined arrangement on the belt of the second conveyor 12. Moreover, the predetermined arrangement is an arrangement in which two packages O are arranged in the conveyance direction and the width direction of the second conveyor 12.

Here, the predetermined arrangement of the package group G produced by the first robot 30 on the belt of the second conveyor 12 is not limited to the arrangement of the above embodiment. The package group G may be made of two packages O, and two packages O may be arranged so as to overlap in the conveyance direction, for example.

(4-3) Modification C

In the above embodiment, the acquisition part 72 acquires the thickness information of the package O obtained by the seal checker 80. Here, the acquisition part 72 may be configured to acquire thickness information on the package O with other devices or sensors.

The invention claimed is:

1. A box-packing system comprising:
a conveyance apparatus;
an evening part having an endless belt that is configured to contact an upper surface of an article flatly evening and smoothing out the upper surface of an article packaged within a soft packaging material;
a robot configured to apply suction, hold, and transport the article packaged within the soft packaging material and conveyed by the conveyance apparatus; and
a control device configured to control the robot to move the article to a box-packing preparation area,
the robot having:
a suction part configured to apply suction to the article from above;
an arm configured to be able to move the suction part in a horizontal direction and a vertical direction; and
a drive part configured to drive the arm in order for the suction part to apply suction to the article at a predetermined vertical location,
the control device having:
an acquisition part configured to acquire thickness information of the article within the soft packaging material evened by the evening part and store the thickness information acquired from the evening part in the control device;
a determination part configured to determine the predetermined vertical location on the basis of the thickness information stored by the control device, the predetermined vertical location corresponding to a vertical location at which the robot applies suction to the article; and
a command generation part configured to generate a command configured to drive the drive part on the basis of the predetermined vertical location determined by the determination part, and wherein the robot drives the arm to the predetermined vertical location and arranges the article in a box-pack placement in the box-packing preparation area.

2. The box-packing system according to claim 1, wherein the evening part has a seal check mechanism configured to inspect a bag produced of the soft packaging material for a sealing defect.

3. The box-packing system according to claim 1, wherein the command generation part generates:
a first command configured to move the suction part to the predetermined height location to apply suction to the article with the suction part; and
a second command configured to move the suction part in the horizontal direction to move the article to the box-packing preparation area in a state in which the article is held by suction by the suction part.

* * * * *